Oct. 16, 1928.

H. S. DICKINSON

TANDEM DISK HARROW

Filed Nov. 12, 1920

INVENTOR
Harry S. Dickinson

Leroy C. Shouts
ATTORNEY

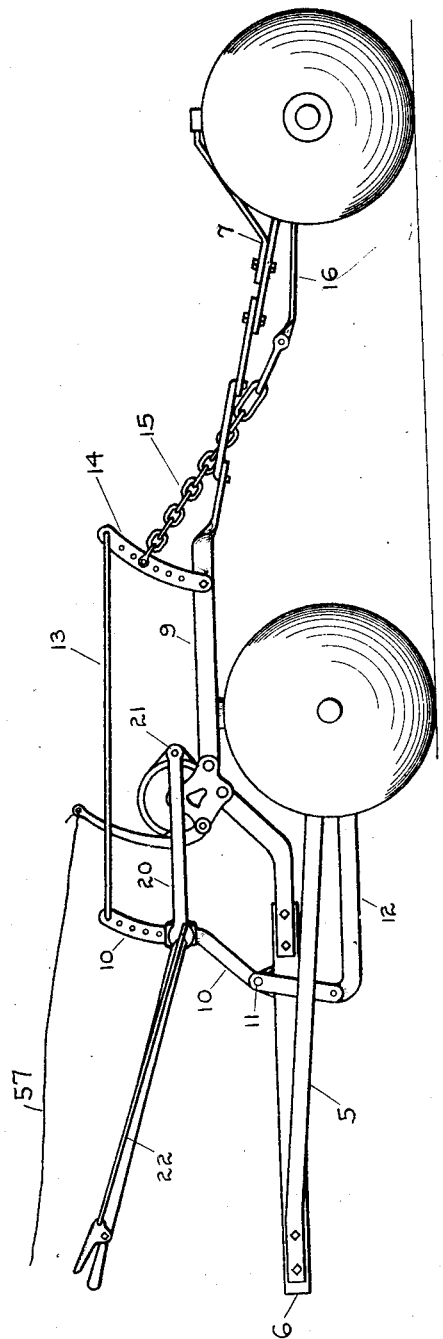

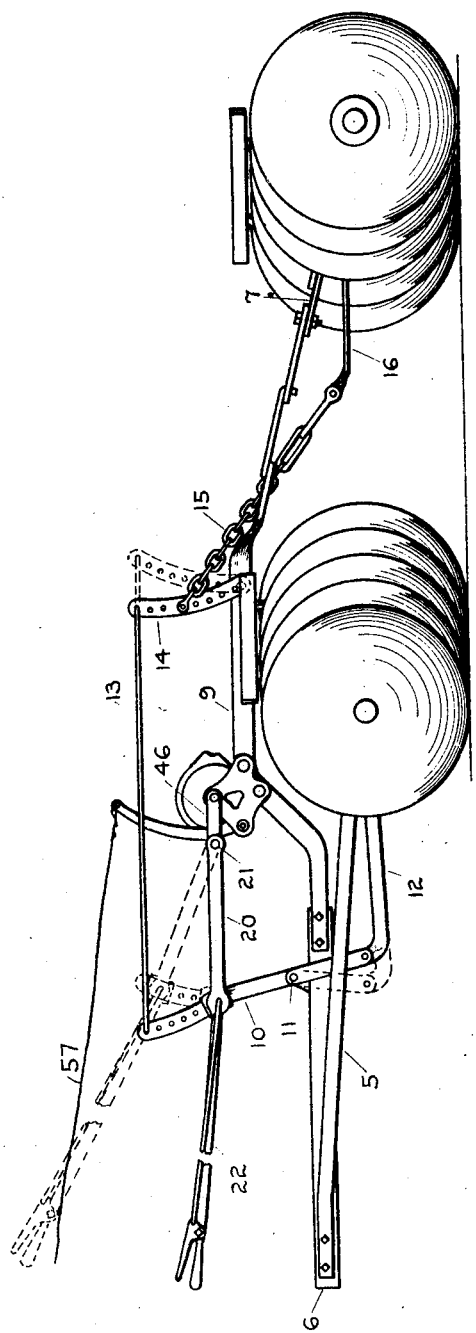

Oct. 16, 1928.

H. S. DICKINSON 1,688,025

TANDEM DISK HARROW

Filed Nov. 12, 1920

INVENTOR
Harry S. Dickinson

Leroy Shouts
ATTORNEY.

Patented Oct. 16, 1928.

1,688,025

UNITED STATES PATENT OFFICE.

HARRY S. DICKINSON, OF MOLINE, ILLINOIS, ASSIGNOR, BY MESNE ASSIGNMENTS, TO EMERSON-BRANTINGHAM CORPORATION, OF ROCKFORD, ILLINOIS, A CORPORATION OF ILLINOIS.

TANDEM DISK HARROW.

Application filed November 12, 1920. Serial No. 423,705.

The invention relates to tandem disk harrows.

It is concerned principally with mechanism for angling the disk gangs into and out of working position.

It is desirable in tandem disk harrows to have a convenient means for angling the gangs in the working position and to return them to transport position, that is, a position in which the disks are parallel with the line of draft. Various constructions have been devised for utilizing the draft on the harrow for angling the gangs, such construction, however, usually requiring that the hitch to the harrow be changed, or that the tractor be stopped and backed up for changing the angle of the gangs. The present invention has been devised for the purpose of avoiding the necessity for changing the hitch, or of stopping the tractor for the purpose of changing the gang angles and at the same time to provide desired adjustments in the angling movement so that the harrow may be set to perform its work in a manner to suit the particular requirements of the occasion.

The general object of the invention is to provide an improved power operated means for angling the gangs of a tandem disk harrow.

Another object is to provide improved adjustments in angling mechanism for tandem disk harrows.

A further object is to utilize the rotative power of the disks for the purpose of angling the gangs.

Other objects and advantages will appear from the specification and drawings.

An embodiment of the invention is illustrated in the accompanying drawing in which Figure 1 is a plan view of the harrow showing the gangs in transport position.

Figure 2 is a side view of the harrow with the gangs in transport position.

Figure 3 is a side view with the gangs in working position.

Figure 1:
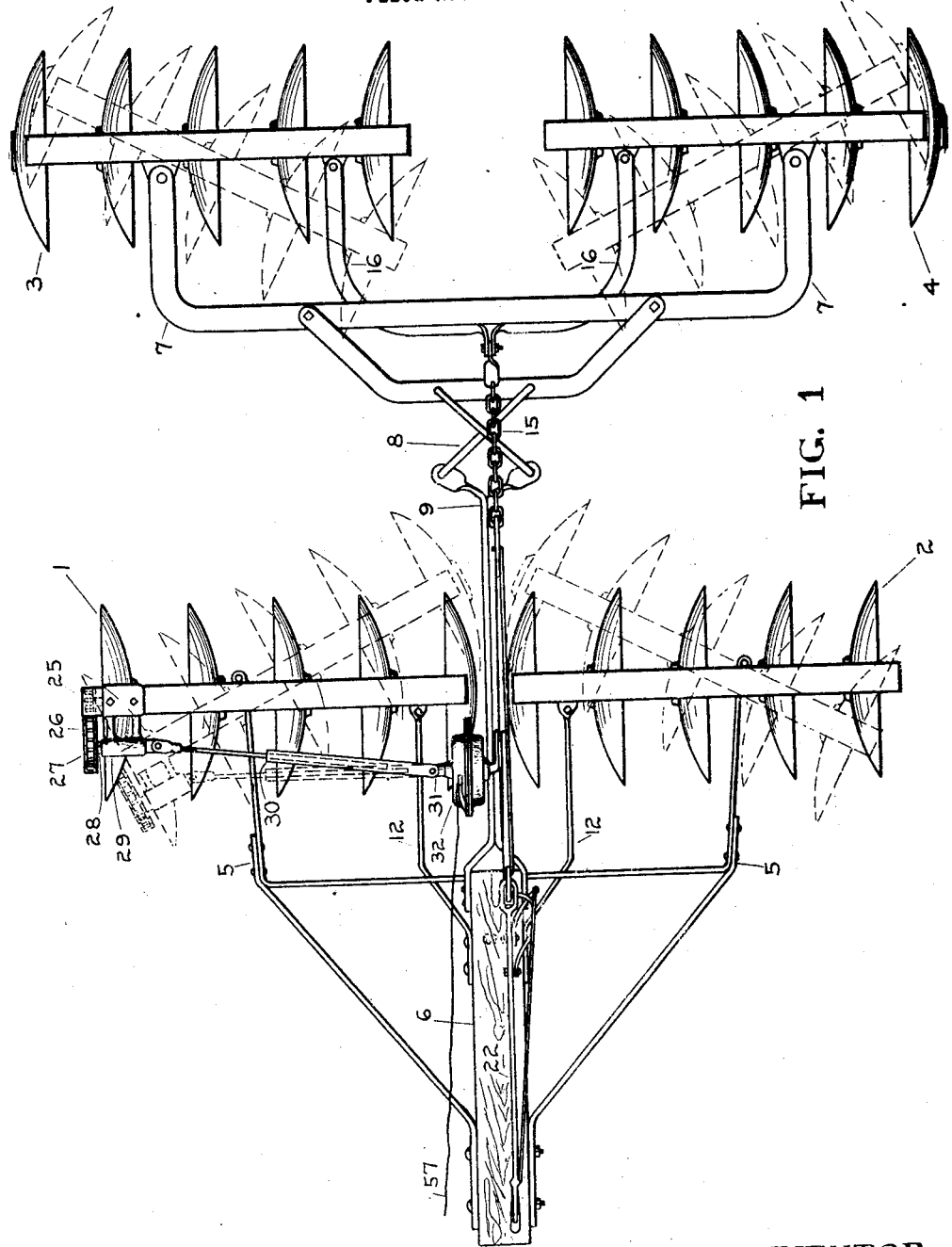

The harrow includes a front pair of gangs 1 and 2 and a rear pair of gangs 3 and 4. The front pair is connected by a frame 5 to a draft tongue 6 and the rear pair is connected by a frame 7 through cross links 8 to an extension 9 of the draft tongue. This gives a suitable, flexible connection between the pairs of gangs and the cross links serve to guide the rear pair as related to the front pair in turning.

The mechanism for angling the gangs includes a lever 10 pivoted at 11 to the draft tongue. Connected to its lower end are links 12 which in turn are connected to the inner ends of the front pair of gangs. The upper end of lever 10 is connected by a link 13 to a second lever 14 pivoted to the tongue extension 9. Lever 14 is connected by a chain 15 to links 16 connected to the inner ends of the rear pair of gangs. It will be clear that when the upper end of lever 10 is moved forward from the position shown in Figure 2 that the links 12 will be moved backward, thus moving the inner ends of the front set of gangs rearwardly and the link 13 will be moved forward, thus pulling the inner ends of the rear pair of gangs forwardly. The reverse action will take place when the lever 10 is moved in the opposite direction except that, as to the rear pair of gangs, the chain 15 is slacked and the gangs automatically drift to their transport position or to the position shown in Figure 3. It will be understood, however, that a rigid connection could be substituted for the chain 15, thus making the action positive in all cases.

Provision is made for varying the angle to which the rear pair of gangs may be moved as related to the angle to which the front pair of gangs may be moved and at the same time providing a mechanism which will return the gangs to their initial or transport position when the mechanism is moved for that purpose. This result is accomplished by having the lever 14 in the form of an arc, the curvature of which is determined by a radius struck from the center 14', that is, the point where the chain 15 is attached to the rear frame. It will be observed by referring to Figure 2 where the disks are in transport position, that the position of the parts will be the same regardless of which of the holes in member 14 are used for connecting the chain 15 to it. It will be noted, however, that if the chain 15 is connected in the bottom hole and the lever 10 moved forward through the arc that it normally is moved through, the chain 15 will be moved through a distance which is relatively small as compared with the distance that it would be moved forward if it were connected in one of the upper holes. In other words, the distance which the chain 15 is moved can be varied, but in every case it will be returned to its initial position.

Provision is also made for varying the angle to which both pairs of gangs are moved in their movement to working position and at the same time, a mechanism that will return both pairs of gangs to transport position regardless of the angle to which they have been moved. This result is secured by making the arm 10 in the form of an arc described by a radius determined by the arm 20 which is pivoted at the point 21. Here again, it will be observed that the position of the link 10 is the same regardless of the adjustment of the arm 20 by means of the hand lever 22 on the lever 10. The arm 20 has a definite forward movement which is fixed but the amount the lever 10 is moved forward will vary depending on whether the arm 20 is connected in one of the lower holes, for example, or in one of the upper holes. In this manner, the angle to which the gangs are moved can be varied but, in every case, both gangs will be returned to the same initial position.

The power for operating the gang angling mechanism is derived from the rotation of the disks. A sprocket 25 is fixed on the end of one of the gang shafts and it drives through a chain 26, a sprocket 27 fixed to a jack-shaft 28 journaled in a bearing 29 carried by the disk gang. Jack-shaft 28 is connected through a universal joint, a slip connection 30, and a universal joint 31 to a clutch 32. This clutch drives the crank or pivot 21 and moves the arm 20 to operate the angling mechanism.

Figure 6:
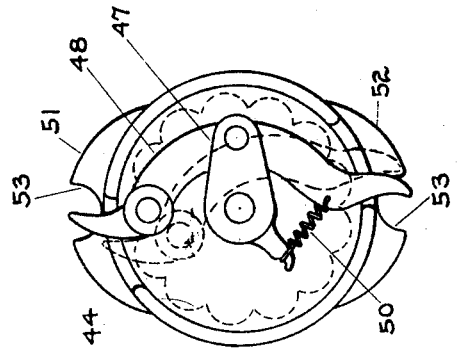
Figures 4, 5 and 6 are detailed views of a clutch mechanism employed in connection with the angling device.
Figure 5:
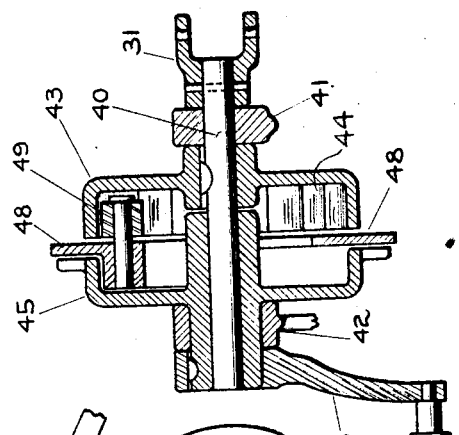
Figure 4:
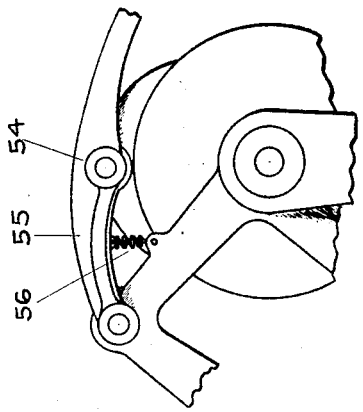

The clutch is shown in detail in Figures 4, 5 and 6. It includes a shaft 40 continuously driven by the universal joint 31 and carried by bearings 41 and 42 fixed to the frame of the harrow. Keyed to the shaft is an internal clutch member 43 having internal notches 44, illustrated in Figure 6. Journaled loosely on the shaft 40 is a member 45 which is keyed to the crank arm 46. It will be clear that the member 43 rotates continuously with the shaft 40, whereas the member 45 normally remains stationary. When it is desired to drive the member 45 and with it crank 46, it, therefore, becomes necessary to momentarily interconnect the parts 43 and 45. For this purpose the member 45 has an exterior extension 47 to which is pivoted an arm 48 carrying a roller 49. The roller is arranged to engage the notches on the interior member 43 and it is normally biased by a spring 50 to engage such notches. Both ends of the arm 48 extend beyond the rim of member 45. The member 45 has two projections 51 and 52 having notches 53 for the reception of a roller 54 carried by a trip arm 55 which is normally biased by a spring 56 so that roller 54 engages in one of the notches 53. The spring 56 is stronger than the spring 50, and, consequently, when the clutch is in its normal position as shown in Figure 7 with the roller 54 in notch 53, the upper end of arm 48 will be biased in a counter-clockwise direction sufficient to keep the roller 49 out of engagement with the notches 44 on the interior of the clutch member 43. Accordingly, the clutch is normally held disengaged and the member 43 will rotate without imparting any motion to member 45. If, however, the trip lever 55 is operated by means of a cord or chain 57, a lever or otherwise so as to pull the roller 54 out of notch 53, the clutch will be engaged because, as soon as roller 54 leaves notch 53, the spring 50 will move lever 48 to cause roller 49 to engage one of the notches 44 on the interior of member 43. This causes clutch member 45 to be rotated with the member 43 and as soon as member 45 has been moved slightly, it will be impossible for the roller 54 to again engage notch 53 because such notch will have passed by the position of the roller. The mechanism will consequently continue in operation until it has moved a half revolution in a clockwise direction as viewed in Figure 6. As it nears the end of a half revolution, the projection 52 comes into contact with roller 54 and gradually raises it against the tension of spring 55 and then the notch 53 in projection 52 comes opposite roller 54, whereupon the tension of spring 56 pulls the roller into the notch thereby contacting the end of lever or arm 48 and moving such arm to cause the roller 49 to move out of engagement with the cooperating notch 44 on member 43. The mechanism is thus automatically stopped after it has moved a half revolution. It will also be observed that, in order to set the mechanism into operation, it is only necessary to give the trip lever 55 a momentary pull such as might be delivered by a chain, a cord or a lever and after such movement has been given, the mechanism will continue in operation for a half revolution and then be automatically stopped.

The operation of the harrow as a whole is as follows:

With the harrow in the transport position as shown in Figure 3 and assuming that it is desired to move the disk gangs into working position and that the harrow is being drawn forward with the gangs in transport position, the operator pulls the cord 57, which trips the clutch. The power of the rotating disks will then be applied to rotate the crank arm 46 from the position in Figure 2 to the position shown in Figure 3, where it will be automatically stopped by the operation of the clutch mechanism heretofore described. This movement will have moved the lever 10 forward and with it the lever 14. Such movement of the levers will have moved the inner ends of the front pair rearwardly and the inner ends of the rear pair of gangs forwardly.

If it is desired to return the gangs to transport position with the tractor moving forward and the gangs in working position, the operator again pulls the cord 57 which trips the clutch and causes it to move a half revolution to move the crank 46 from the position shown in Figure 3 to that shown in Figure 2 where it is automatically stopped. This movement will have moved the levers 10 and 14 rearwardly, thereby having moved the inner ends of the front pair forward and having slacked the chain 15 to permit the inner ends of the pair to move rearward due to the resistance of the ground.

The operator can change the working angle to which the discs will be moved by simply adjusting the lever 22 which will vary the effect of the throw of the crank 46 on the lever mechanism for angling the discs. The gangs will always be returned to transport position regardless of how the mechanism is set to obtain a different working angle.

The operator can also angle the rear gangs differently from the front gangs by simply connecting the chain 15 in the desired hole in lever 14. This will vary the effective action of the link mechanism on the rear gangs, but in each case will return the gangs to transport position regardless of the angle at which they have been moved for working.

It is to be understood that the construction shown is for purposes of illustration and that variations may be made therein without departing from the spirit and scope of the invention as defined in the appended claims.

What I claim is:

1. In a harrow, the combination of a plurality of sets of pivoted harrow sections arranged in alignment with each other, means for setting said harrow sections, said means cooperating to move one end of said pivoted sections, and automatic means for moving said ends relatively to each other and restoring said ends to their original position, the adjustment of the setting means being maintained during said movement.

2. In a harrow, the combination of a plurality of sets of pivoted harrow sections, one set being arranged in rear of the other, means for setting said harrow sections, said means cooperating to move the inner ends of said harrow sections and automatic means for moving said ends relatively to each other, and restoring said ends to their original position, the adjustment of the setting means being maintained during said movement.

3. In a harrow, the combination of a plurality of sets of pivoted harrow sections, means for setting one of said harrow sets, said means including a lever mechanism, means for moving said harrow set from its set position, said means including a clutch for actuating said lever mechanism.

4. A disk harrow having a draft frame, a pair of gangs, a clutch mechanism mounted on the draft frame, said mechanism having a driving and a driven member, means for rotating said driving member from one or more of the disks of one of the gangs, and means connecting said driven member to the gangs for moving them between working and transport positions.

5. A disk harrow having a draft frame, a pair of gangs, and clutch mechanism for angling the gangs operated by rotation of the disks of one of the gangs, said mechanism being mounted on the draft frame and having a crank connection with the gangs and including means for varying the angle to which the gangs are moved and for causing the gangs to be returned to a given transport position regardless of the angle to which they have been moved.

6. A disk harrow having a draft frame, a pair of gangs, and mechanism operated by rotation of the disks of one of the gangs for moving them back and forth between working and transport positions, including a crank member adapted to be rotated in substantially half revolution movements and a connection between said crank member and the draft frame including a lever pivoted on said frame, a push-and-pull link connected at one end to said crank member and at its opposite end to said lever for translating said movements to the gangs, the lever having an arcuate portion substantially concentric with the connection of said link to the crank, and the link being adjustably connected to said arcuate portion, whereby the angle to which the gangs are moved may be adjusted and the gangs will be returned to a transport position regardless of the angle to which they have been moved.

7. A disk harrow having a draft frame, a pair of gangs, clutch mechanism mounted on the draft frame and connected with the gangs for angling them with respect to the line of draft, and means having a flexible connection between the clutch mechanism and one of the gangs for operating said mechanism by rotation of said gang disks.

8. A disk harrow having a draft frame, a pair of gangs, clutch mechanism mounted on the draft frame and connected with the gangs for angling them with respect to the line of draft, and a flexible telescopic connection between the clutch mechanism and one of the gangs for operating said mechanism by rotation of said gang disks.

9. A disk harrow having a draft frame, a pair of gangs, clutch mechanism mounted on the draft frame and connected with the gangs for angling them with respect to the line of draft, and a driving connection between the clutch mechanism and one of the gangs comprising an endless chain driven by rotation of the disks of said gang, and a flexible and telescopic shaft connection between said chain and the clutch mechanism.

In testimony whereof, I affix my signature.

HARRY S. DICKINSON.